United States Patent Office 3,796,796
Patented Mar. 12, 1974

3,796,796
PROCESS FOR CONVERTING HYDROGEN SULFIDE AND SULFUR DIOXIDE TO ELEMENTAL SULFUR
Andre Deschamps, Chatou, Claude Dezael, Maisons-Laffitte, and Philippe Renault, Noisy-le-Roi, France, assignors to Institut Francais du Petrole, des Carburants et Lubrifiants
No Drawing. Filed Nov. 18, 1971, Ser. No. 200,227
Claims priority, application France, Nov. 30, 1970, 7043077
Int. Cl. C01b 17/04
U.S. Cl. 423—575          9 Claims

ABSTRACT OF THE DISCLOSURE

Sulfur is obtained by reacting hydrogen sulfide with sulfur dioxide in contact with a liquid phase containing a selected alcohol, polyol, polyalkyleneglycol or ether thereof. An essential feature is the use of a catalyst which is both a partial ester and a partial salt of metal $I_A$ or $II_A$ from an organic polycarboxylic acid. This catalyst is highly active and stable over long periods, the activity decrease being, for example, less than about 1.5% after 20 hours of run.

---

This invention relates to an improved process for manufacturing elemental sulfur by reacting hydrogen sulfide with sulfur dioxide.

According to a known process, sulfur may be manufactured by reacting hydrogen sulfide with sulfur dioxide according to the reaction:

$$2H_2S + SO_2 \rightarrow 3S + 2H_2O$$

This reaction may be carried out in the presence of an aqueous or organic liquid phase, optionally with catalysts.

The applicants have described in their French Pat. No. 1,592,092 or the corresponding U.S. Pat. No. 3,598,529 a process for manufacturing sulfur according to the above reaction, in which the liquid phase contains compounds of the alcohol type, for example heavy alcohols, polyols or polyalkylene glycols or their derivatives, and the catalyst consists of an alkali or alkaline-earth metal salt of a carboxylic organic acid. According to a particular embodiment, a polycarboxylic acid can be used to manufacture the catalyst, said polycarboxylic acid being at least partly esterified. For example a methyl or ethyl mono ester thereof can be used.

This process results in relatively good yields, i.e. high conversion rates of acid gas to sulfur, also when the gas has a relatively low content of acid gas.

However this process has a drawback: after a limited time of use, the catalyst activity decreases substantially which makes necessary rather frequent regenerations thereof.

This invention avoids the above drawback by providing a catalyst which is more active, or at the least of the same activity as the known catalysts with, however, an increased stability.

This invention thus relates to a process for manufacturing elemental sulfur by reacting hydrogen sulfide with sulfur dioxide in contact with a liquid phase essentially containing a compound of the formula R—OH in which R is a radical selected from:

the aliphatic hydrocarbon radicals of 8–40 carbon atoms, the aliphatic hydrocarbon radicals of 8–40 carbon atoms with 1 to 3 hydroxy substituents, and
the radicals of the formula:

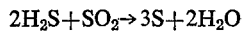

in which $R_1$ is hydrogen or a monovalent aliphatic hydrocarbon radical of 1–20 carbon atoms, $R_2$ is a divalent aliphatic hydrocarbon radical of 2–10 carbon atoms and $n$ is an integer from 1 to 20, said liquid phase also containing a catalyst consisting of a salt formed between a metal of the Groups I–A and II–A of the periodic classification of the elements and an organic polycarboxylic acid at least one acid group of which is esterified by said compound R—OH.

The compound R—OH will be hereinafter referred to as solvent.

This process uses a solvent-catalyst pair, the catalyst being a salt of a polyacid partially esterified by the solvent.

The solvents may be used among the following types:

The heavy alcohols of 8–40 carbon atoms per molecule
The polyols of 8–40 carbon atoms with 2 to 4 hydroxy groups
The polyalkylene glycols
The mono- and di-ethers of these polyalkylene glycols.

By way of examples of solvents to be used in this invention, the following may be mentioned: 1-octanol, 1-dodecanol, 1-hexadecanol, 1-eicosanol, 9-heptadecanol, 1,4-heptadecanediol, 1,4,8,pentadecane triol, penta-ethylene glycol, hexaethylene glycol, octa-ethylene glycol, di-ethylene glycol, triethylene glycol, polyethylene glycol of an average molecular weight of 400, tripropylene glycol, propylene glycol, polypropylene glycol of an average molecular weight of 600, mono ethyl ether of octaethylene glycol, monobutyl ether of tetrapropylene glycol, monomethyl ether of polyethylene glycol of an average molecular weight of 400, mono ethyl ether of tetrapropylene glycol.

The liquid phase may contain at least 80% by weight of the solvent R—OH and preferably more than 90% thereof.

The catalysts of this invention are selected from the alkali or alkaline earth metal salts of polycarboxylic acids having at least one acid group esterified by the solvent R—OH.

The catalysts are usually of the general formula:

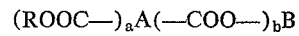

in which R is defined as above. A is an organic radical of valence $(a + b)$ having at least two carbon atoms; B is an alkali or alkaline earth metal of valence $b$; $a$ is a positive integer and $b$ is an integer which is at least the valence of the metal B, i.e. 1 or 2 when the metal is mono- or divalent.

This formula is illustrative but not limitative. For example, when R comprises a plurality of OH groups, the later may be esterified.

On the other hand, several metals may be simultaneously present in the same molecule. Other embodiments will be obvious to those skilled in the art.

The preferred alkali and alkaline earth metals are lithium, potassium, sodium and calcium.

The catalyst may be manufactured as follows: a solvent (alcohol or polyol) is first selected, then a part of this alcohol or polyol is esterified by means of an organic polyacid an anhydride or another derivative thereof, before salifying the remaining free acid groups by a hydroxide or another equivalent compound of the selected metal.

These polyacids may be selected for example, from the following four families:

1. The linear or branched, saturated or unsaturated, acyclic polycarboxylic acids having from 2 to 30 carbon atoms, preferably 2 to 20 and most preferably 4 to 10 carbon atoms. The preferred polyacids of this family and of the following families No. 2 to 4 have, for example, from 2 to 5 acid groups.

2. The saturated or unsaturated alicyclic polycarboxylic acids having from 5 to 30 carbon atoms and preferably from 6 to 10.
3. The aromatic polycarboxylic acids having from 8 to 40 and preferably from 8 to 12 carbon atoms, these acids comprising one or more rings, either condensed or not.
4. The heterocyclic polyacids having from 4 to 30 and preferably from 4 to 10 carbon atoms.

The heteroatom(s) of the heterocycle may be oxygen, nitrogen or sulfur.

The polyacids may be substituted with one or several groups for example, alcohol, thiol, ether, aldehyde, amine and ketone and one or more hydrogen atoms of these polyacids may be substituted with a halogen atom or a nitro group.

The following compounds illustrate the first family: malonic acid, isopropyl malonic acid, succinic acid, α,α-dimethyl glutaric acid, adipic acid, tetradecanedioic acid, 1,1,2-ethane tricarboxylic acid, 2,2,6,6-heptane tetracarboxylic acid, maleic acid, glutaconic acid, tartronic acid, citric acid.

The following acids illustrate the second family: 1,3-cyclohexane dicarboxylic, 4-chloro-1,3-cyclohexane dicarboxylic, 1,4-decahydronaphthalene dicarboxylic, 2-phenyl-1,3,5-cyclohexane tricarboxylic.

From the third family, the following acids may be selected: o-, iso- or tere-phthalic, trimesic, mellitic, 4-methyl-o-phthalic, 4-hydroxy-o-phthalic, 1,2-naphthalene dicarboxylic, 1,3,5-naphthalene tricarboxylic, 1-methoxy-2,3-naphthalene-dicarboxylic, 1-hydroxy-3,5-naphthalene dicarboxylic and 1,2-anthracene dicarboxylic.

From the fourth family, the following acids may be selected: 2,3-furan-dicarboxylic, 1,2-tetrahydrothiophene-dicarboxylic, 2,3-pyridine dicarboxylic, 5-methyl-2,3-pyridine dicarboxylic, 2-methyl-3-ethyl-1,4-pyridine dicarboxylic, trimesitic.

The process may be worked out within a broad temperature range, for example from 20 to 160° C. However the process is particularly attractive, as compared with the prior processes, when used at a high temperature, for example from 120 to 160° C.

The process may be operated within a broad pressure range, for example 0.1–50 kg./cm.² An advantageous feature of the process is its operability under atmospheric pressure.

The present process may be used to treat a gas with a content of acid gas ($H_2S+SO_2$) from 0.1 to 100% by volume. However it is preferably used to treat a gas with a low content of acid gas ($H_2S+SO_2$), for example, from 0.1 to 40% by volume and particularly from 0.5 to 5% by volume.

The catalyst concentration in liquid phase is advantageously from 0.1 to 5% by weight and preferably from 0.5 to 2% by weight.

The liquid phase may contain both a ROH compound and from 0.01 to 20% by volume of water, preferably from 0.1 to 2% of water.

French Pat. No. 1,592,092 describes the use, as catalyst, of an alkali or alkaline earth metal salt of a polycarboxylic acid in a solvent such as defined in the present specification. It is suggested to use an acid salt, i.e. a salt of a polyacid having at least one free acid group. It could be expected, from said patent specification that, when contacting the acid salt used as catalyst with the solvent R—OH, the free acid groups of the salt would be esterified by the compound R—OH. If this esterification had occurred, the catalytic system of the present invention would have been obtained with all its advantages. However it has been found that the ester was not formed. This is shown by the following experiments:

Examples 1 to 3 are given for comparison purposes; Example 4 and the following examples are illustrative of this invention.

EXAMPLE 1

There is used a tower of 4 cm. diameter and 1 meter height. 500 liters per hour of a gas with the following composition by volume: $SO_2$, 0.5%; $H_2S$, 1%; $CO_2$, 16%; $H_2O$, 25%; $N_2$, 57.5%: are injected at the bottom of the tower.

The tower has been previously filled up with 300 cc. of polyethylene glycol of molecular weight 400 containing 2 g. (10 millimoles) of potassium acid ortho phthalate. The solution is maintained at 130° C. After 4 hours, the gaseous effluent contains only 0.48% of $H_2S$ and $SO_2$; the purification rate is thus 68.1%.

The purification rate is defined as follows:

Percent R $$= \frac{\text{moles of } H_2S+SO_2 \text{ at inlet} - \text{moles of } H_2S+SO_2 \text{ at outlet}}{\text{moles of } H_2S+SO_2 \text{ at inlet}} \times 100$$

After 20 hours, the purification rate is 61.9%.

EXAMPLE 2

Example 1 is repeated with 10 millimoles of neutral potassium orthophthalate instead of the acid phthalate; the purification rate is 74.2% after 4 hours and 67.9% after 20 hours.

EXAMPLE 3

Example 1 is repeated with 10 millimoles of K monobutyl orthophthalate, the other conditions being unchanged; the purification yield is 78% after 4 hours and 71.1% after 20 hours.

EXAMPLE 4

Example 1 is repeated with 10 millimoles of the following salt:

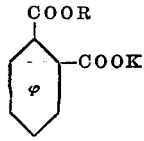

in which R is a polyethylene glycol radical or molecular weight 350, the other conditions being unchanged. The purification rate is 82.1% after 4 hours and 81.2% after 20 hours.

EXAMPLE 4 Bis

Example 4 is repeated, the amount of salt being 2.6 g. instead of 10 millimoles, so that the weight of salt is the same as that of potassium monobutyl orthophthalate in Example 3. The purification rate is 81.4% after 4 hours and 80.1% after 20 hours.

These examples show that the neutral phthalate is a better catalyst than the acid phthalate and that the mixed phthalates with one acid group esterified and the other salified give better yields than the above phthalates. It was expectable that if the ester had been formed in Example 1, the yields would have been higher, if not at the beginning, at least after 20 hours.

In the following examples No. 5 to 12, Example 4 has been repeated with a different catalyst.

EXAMPLE 5

The solvent R—OH is 1-eicosanol and the catalyst has the formula:

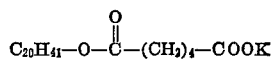

It has been obtained by esterifying adipic acid with 1-eicosanol and then salifying with potassium hydroxide.

With this reaction mixture, the acid gas purification yield is 77% after 4 hours and 75.8% after 20 hours.

EXAMPLE 5 Bis (comparative example)

Example 5 is repeated except that the catalyst is monopotassium adipate. The purication yield is 76.2% after 4 hours and 69.6% after 20 hours.

EXAMPLE 6

The solvent is 1,4-heptadecanediol and the catalyst has the formula:

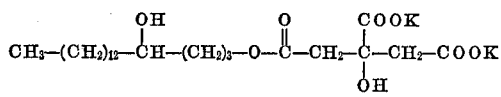

It may be obtained by esterifying 1,4-heptadecanediol with citric acid and then salifying with potassium hydroxide.

The purication rate is 76.4% after 4 hours and 75.5% after 20 hours.

EXAMPLE 7

The solvent is octaethylene glycol mono ethyl ether; the catalyst has the formula:

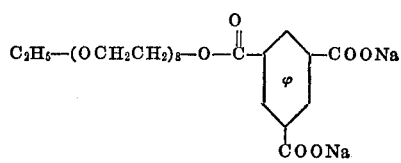

It may be obtained by esterifying octaethylene glycol monoethyl ether with trimesic acid and then salifying with sodium hydroxide.

The purication rate is 78% after 4 hours and 76.8% after 20 hours.

EXAMPLE 8

The solvent is 1-eicosanol and the catalyst has the formula:

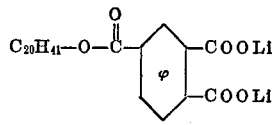

It may be obtained by esterifying 1-eicosanol with trimellitic acid and then salifying with LiOH.

The purication yield is 74.7% after 4 hours and 73.5% after 20 hours.

EXAMPLE 9

The solvent is polyalkylene glycol of molecular weight 400 and the catalyst has the formula:

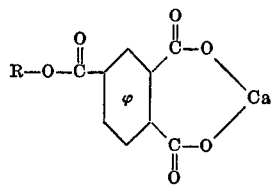

in which R is a polyalkylene glycol (molecular weight: 400) group. The catalyst may be obtained by esterifying trimellitic acid with the solvent and then salifying with lime.

EXAMPLE 10

The solvent is polypropylene glycol of an average molecular weight of 600. The catalyst has the formula:

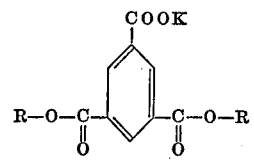

in which R is a polypropylene glycol radical (molecular weight: 600). This catalyst is obtained by esterifying trimesitic acid with the solvent and then salifying with potassium hydroxide.

The purification yield is 78.3% after 4 hours and 76.6% after 20 hours.

EXAMPLE 11

The solvent is hexaethylene glycol and the catalyst has the formula:

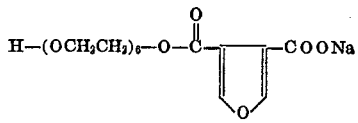

It is obtained from 3,4-furan dicarboxylic acid.

The purification rate is 74.1% after 4 hours and 72.7% after 20 hours.

EXAMPLE 12

The solvent is polyethylene glycol of molecular weight 400. The catalyst has the formula:

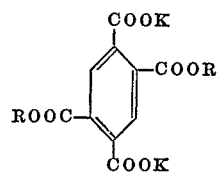

in which R is a polyethylene glycol 400 radical. This catalyst is manufactured from pyromellitic acid.

The purification yield is 79.1% after 4 hours and 77.8% after 20 hours.

All these examples show the remarkable stability of the catalysts of this invention. The yields after 20 hours are close to the initial yields. A maximal difference of 1.5% is observed to be compared with about 6% for the catalysts of the comparative examples.

What we claim as our invention is:

1. In a continuous process for manufacturing elemental sulfur by reacting hydrogen sulfide with sulfur dioxide in contact with a liquid phase comprising a solvent-catalyst pair consisting essentially of a polyalkylene glycol solvent and 0.1–5% by weight of a catalyst which is both a partial ester and a partial salt formed between (i) a metal from Group IA or Group IIA of the periodic classification of the elements, and (ii) an organic polycarboxylic acid having at least one of its acid groups esterified with an organic radical, the improvement wherein:

said esterified acid groups are esterified with a polyalkylene glycol, whereby said catalyst is stable over long periods and exhibits after 20 hours of said process an activity decrease of less than about 1.5%.

2. A process according to claim 1, wherein the metal of the catalyst is sodium or potassium.

3. A process according to claim 1, wherein the polycarboxylic acid of the catalyst is a diacid or a triacid.

4. A process according to claim 1, in which the temperature is selected from 20 to 160° C. and the pressure from 0.1 to 50 kg./cm.²

5. A process according to claim 1, in which the liquid phase contains at least 80% by volume of the compound R—OH.

6. A process according to claim 1, wherein the liquid phase contains from 0.01 to 20% by volume of water.

7. A process according to claim 1, wherein the solvent is a polyethylene glycol of an average molecular weight of about 400 and the catalyst is the mono potassium salt of orthophthalic acid mono polyethylene glycol ester.

8. A process as defined by claim 1, wherein said organic polycarboxylic acid is selected from the group consisting of:
 (a) an acyclic acid of 2–30 carbon atoms,
 (b) an alicyclic acid of 5–30 carbon atoms,
 (c) an aromatic acid of 8–40 carbon atoms,
 (d) a heterocyclic acid of 4–30 carbon atoms.

9. A process as defined by claim 8, wherein ROH is a polyethylene glycol.

References Cited
UNITED STATES PATENTS

| | | | |
|---|---|---|---|
| 3,598,529 | 8/1971 | Deschamps et al. | 423—575 |
| 3,050,370 | 8/1962 | Urban et al. | 423—575 |
| 2,881,047 | 4/1959 | Townsend | 423—575 X |

GEORGE O. PETERS, Primary Examiner